United States Patent
Falk et al.

(10) Patent No.: US 9,398,024 B2
(45) Date of Patent: Jul. 19, 2016

(54) SYSTEM AND METHOD FOR RELIABLY AUTHENTICATING AN APPLIANCE

(75) Inventors: Rainer Falk, Erding (DE); Steffen Fries, Baldham (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 52 days.

(21) Appl. No.: 13/380,628

(22) PCT Filed: Mar. 31, 2010

(86) PCT No.: PCT/EP2010/054300
§ 371 (c)(1),
(2), (4) Date: Dec. 23, 2011

(87) PCT Pub. No.: WO2010/149400
PCT Pub. Date: Dec. 29, 2010

(65) Prior Publication Data
US 2012/0102319 A1 Apr. 26, 2012

(30) Foreign Application Priority Data
Jun. 23, 2009 (DE) .......................... 10 2009 030 019

(51) Int. Cl.
| | |
|---|---|
| *H04L 29/06* | (2006.01) |
| *G06F 21/30* | (2013.01) |
| *G06F 21/31* | (2013.01) |
| *H04L 9/32* | (2006.01) |
| *H04L 9/08* | (2006.01) |

(52) U.S. Cl.
CPC ............ *H04L 63/123* (2013.01); *G06F 21/305* (2013.01); *G06F 21/31* (2013.01); *H04L 9/083* (2013.01); *H04L 9/3213* (2013.01); *H04L 9/3236* (2013.01); *H04L 9/3271* (2013.01); *H04L 63/0823* (2013.01); *G06F 2221/2103* (2013.01); *G06F 2221/2129* (2013.01); *G06F 2221/2153* (2013.01); *H04L 2209/805* (2013.01); *H04L 2463/061* (2013.01)

(58) Field of Classification Search
CPC ...................................................... H04L 9/3271
USPC ......................................................... 713/156
See application file for complete search history.

(56) References Cited

U.S. PATENT DOCUMENTS

| | | | | |
|---|---|---|---|---|
| 2003/0204734 | A1* | 10/2003 | Wheeler ........................ | 713/184 |
| 2006/0154631 | A1* | 7/2006 | Nakano et al. ............. | 455/181.1 |
| 2009/0113534 | A1 | 4/2009 | Nanda et al. ...................... | 726/9 |

FOREIGN PATENT DOCUMENTS

| | | | | |
|---|---|---|---|---|
| EP | | 0931430 B1 | 6/2006 | ............. B60R 25/00 |

OTHER PUBLICATIONS

International PCT Search Report and Written Opinion, PCT/EP2010/054300, 11 pages, Jun. 29, 2010.
Menezes, A. et al., "Handbook of Applied Crptography", Chapter 10, CRC Press, Inc., pp. 385-424, 1997.

* cited by examiner

*Primary Examiner* — Jacob Lipman
(74) *Attorney, Agent, or Firm* — Slayden Grubert Beard PLLC

(57) ABSTRACT

A system and an apparatus (41) for reliably authenticating an appliance (42) involves a challenge message (C) being linked to the examination apparatus (40) by an examiner context information item (K). It is therefore more difficult for an attacker to feign an identity of an appliance. The application can be used in authentication scenarios, particularly in telecommunication, in which sensitive messages are interchanged.

18 Claims, 7 Drawing Sheets

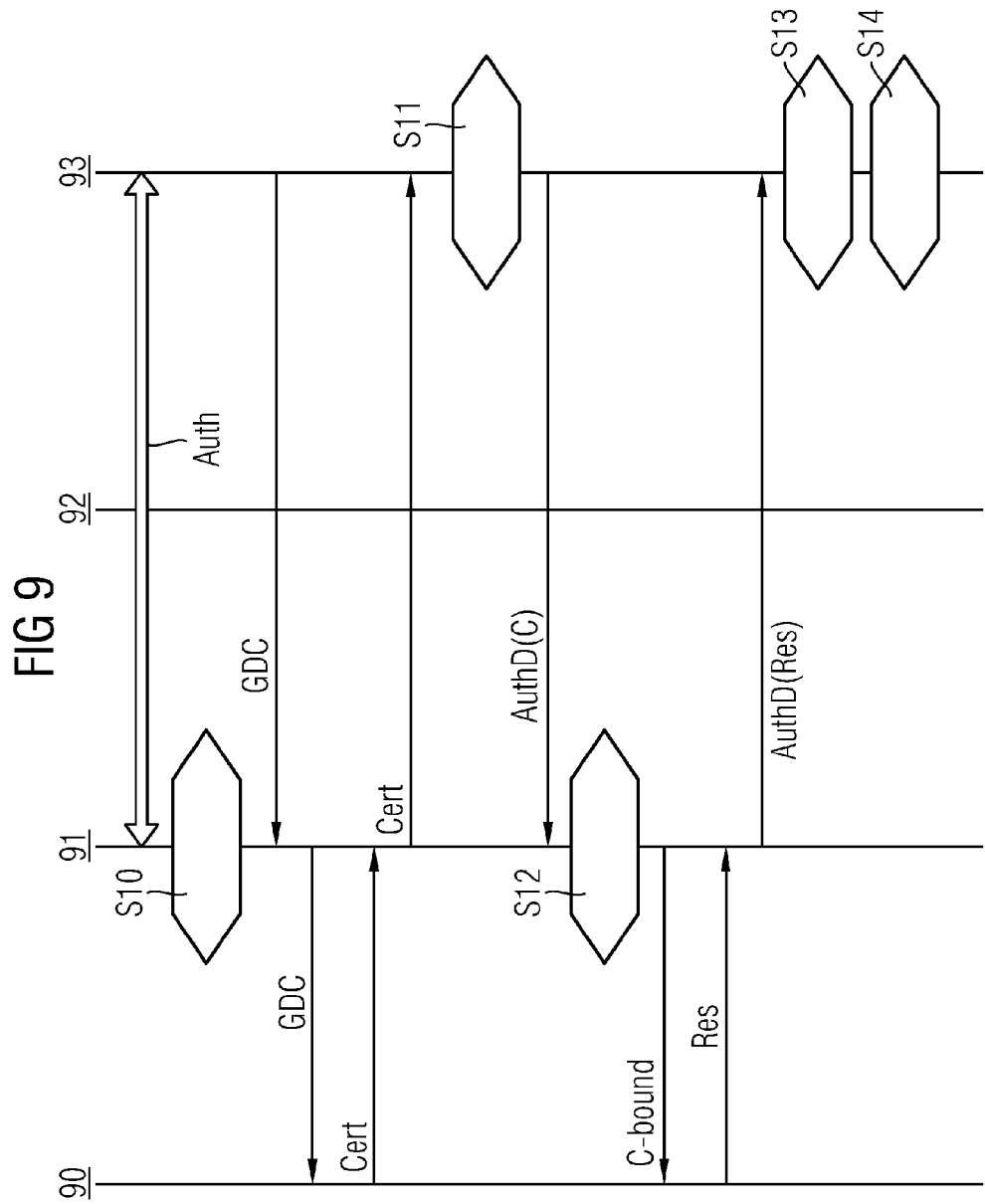

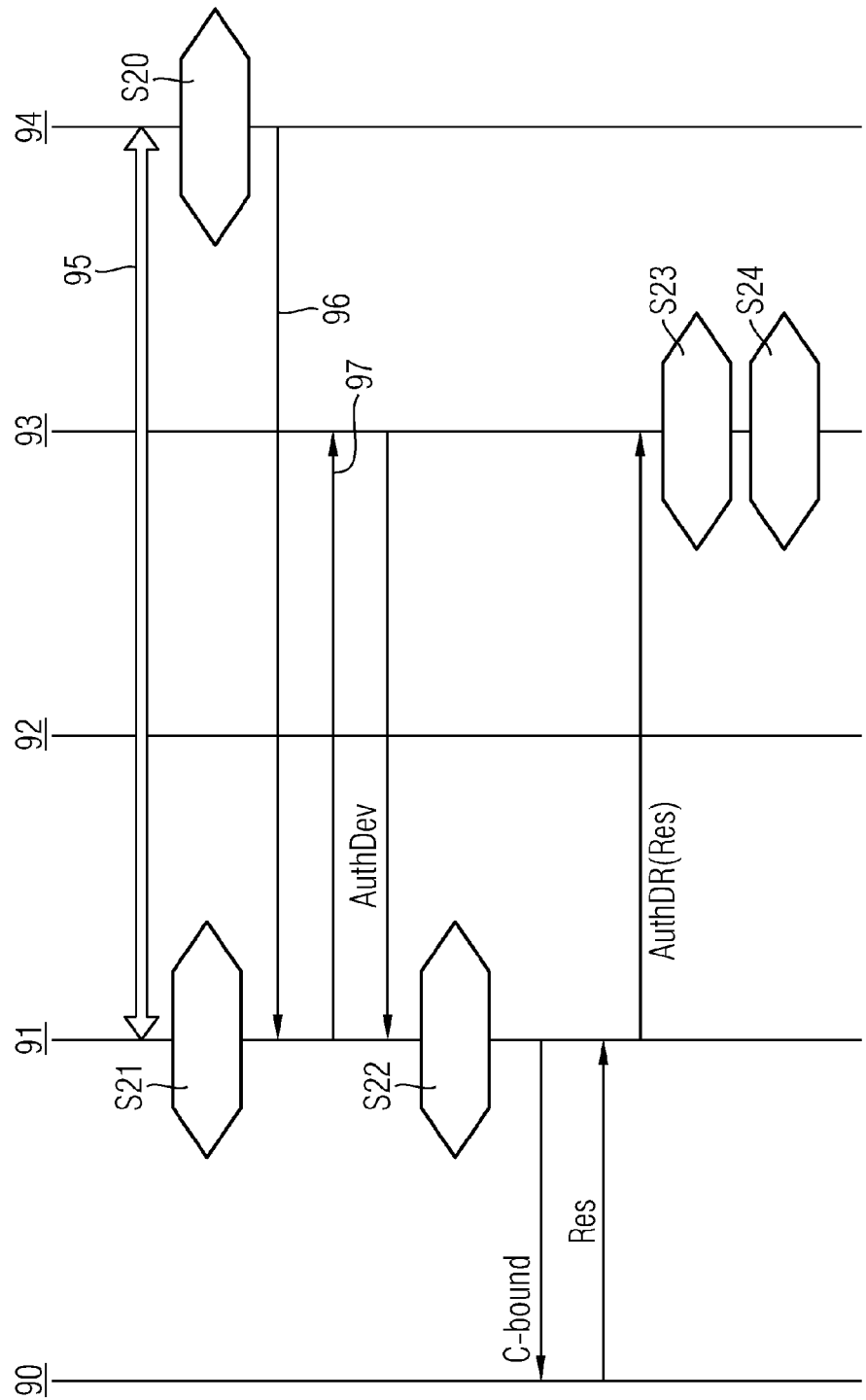

SYSTEM AND METHOD FOR RELIABLY AUTHENTICATING AN APPLIANCE

CROSS-REFERENCE TO RELATED APPLICATIONS

This application is a U.S. National Stage Application of International Application No. PCT/EP2010/054300 filed Mar. 31, 2010, which designates the United States of America, and claims priority to German Patent Application No. 10 2009 030 019.8 filed Jun. 23, 2009. The contents of which are hereby incorporated by reference in their entirety.

TECHNICAL FIELD

The present invention relates to a system that is suitable for reliably authenticating a device by linking examiner-context information to a challenge message, and relates also to a corresponding method. The invention relates further to an examiner-linking apparatus that is suitable for modifying a challenge message as a function of examiner-context information as well as to a corresponding method. The invention relates furthermore to a computer program product for implementing at least one of the aforementioned methods as well as to a data memory that stores the computer program product.

BACKGROUND

The process of authentication is generally one of verifying an identity. Messages are typically exchanged during said process between a checking unit and a device requiring to be authenticated. An attacker intercepting said messages needing to be exchanged will be able to use the intercepted messages to fake an identity. The authentication can serve, for instance, for reliably recognizing a device, for example a sensor or battery. In another application scenario the authentication serves to recognize original products. It may also be necessary to check the identity of the client or server in the case of client-server communication.

Conventional methods often employ a challenge-response process for authentication purposes. A challenge message created as a function of a random number, for example, is therein transmitted to the device. The device thereupon uses a secret cryptographic key to compute a second value that is referred to also as a response message. Said response message is sent back to the challenge's originator which thereupon checks whether the response is correct. Since only an original product or device will be able to compute a correct response message, it will hence be possible to reliably distinguish an original product or device from a fake.

With conventional authentication methods it is often necessary to check a device not only locally but also from a distance via a communication facility, for example over the internet, via mobile radio, or over other data links. It is necessary particularly when the device is remotely maintained. The problem often arising when an identity is remotely checked is that an intermediate instance is able to read out messages and use them to fake an identity. This attack scenario is known as a man-in-the-middle attack.

Symmetric RFID tag authentication is applied in conventional methods. Chips are therein employed that perform cryptographic operations for reliably recognizing an original product.

An asymmetric crypto system consists of a plurality of intercommunicating instances each of which possesses a pair of keys comprising a secret and a non-secret part. Asymmetric cryptography methods are known also as public key methods.

What are termed key-binding methods are furthermore used in conventional methods. A cryptographic key is therein committed to a specific purpose. This is done in conventional methods by means of, for instance, key derivation using a key derivation function which as input parameter, in addition to the non-committed key, employs a character string that describes the intended purpose. As an example thereof, in the case of WiMAX a Mobile IP Root Key MIPRK is first computed from a non-committed key EMSK and other, committed mobile IP keys computed from said MIPRK.

Network security protocols are furthermore used in conventional methods for cryptographically protecting IP-based communication. The communication partners are therein authenticated both unilaterally and mutually. Frequently used protocols that authenticate a communication partner are known as SSL, TLS, or IKE for IPsec. The authentication of a communication partner, especially an http server, via SSL or TLS is therein performed using a digital certificate. In addition to the server's public key, said certificate also contains information about the server, in particular its identifiers such as, for example, its name, DNS name, or IP address.

Known likewise from conventional methods is the Kerberos protocol with the aid of which authentication and authorization can be realized via a trusted third party. Kerberos is based on the use of symmetric keys.

FIG. 1 shows the Kerberos authentication service according to a conventional method. Kerberos is a distributed authentication service or a network protocol that was developed for open and insecure computer networks such as the internet, for instance. According to Kerberos the authentication is handled by a trusted third party, for example a Kerberos server.

According to the Kerberos method described in FIG. 1, a user N employs a request message or a request R-TG-T at a first step to apply for a Ticket-Granting Ticket by means of an R-TG-T message from a Kerberos server KS. A ticket is therein an authorization message by means of which the respective owner of the message is granted access to the server S. The Kerberos server KS conveys a ticket T and a ticket-granting session key TGSK to the user N at an ensuing step. For conveying the two messages—ticket T and ticket-granting session key TGSK—the Kerberos server KS has a key distribution service KDS. Said key distribution service KDS communicates with a database DB over a data link.

At an ensuing step of the method the user N applies for a service-grant ticket SGT, for which purpose the Kerberos server KS accesses a ticket-granting server TGS. The ticket-granting server TGS thereupon conveys a ticket message T and a session key SK to the user N. The user N creates a request service message RS as a function of the received messages and conveys it to another server S. Said server S conveys a server authenticator message SA to the user N as a function of a check performed on the request service message RS.

Another example of a network protocol according to a conventional method is SAML, known also as Secure Assertion Mark-up Language. In contrast to Kerberos it is also possible to use asymmetric methods in SAML.

FIG. 2 describes a device authentication process according to a conventional method.

FIG. 2 is a schematic of the exchange of messages between an RFID reader RFID-LG and an RFID tag RFID-T according to an asymmetric cryptography method. What is shown therein is a unilateral authentication of the RFID tag RFID-T.

After a request A (get certificate) from the RFID reader RFID-LG, the RFID tag sends its certificate to the RFID reader RFID-LG. The certificate of the RFID tag RFID-T has the RFID tag's public key. The public key is made available or conveyed in, for example, a public key signature message PKSN. The certificate of the RFID tag RFID-T has a signature of a certificate issuer. If the RFID reader RFID-LG is unable to successfully verify the certificate of the RFID tag RFID-T, the RFID tag RFID-T will be recognized as not being original, which will cause the process to be terminated. If the certificate is recognized as being valid, the RFID reader RFID-LG will generate a randomized challenge message and send it to the RFID tag. The RFID tag RFID-T computes a response message Re as a function of a private key of the RFID tag RFID-T. Said response message Re is conveyed to the RFID reader RFID-LG. The RFID reader RFID-LG verifies the response message Re using the public key of the RFID tag RFID-T. The RFID tag RFID-T will be accepted or rejected as a function of said verification, which is to say will be recognized as being original or fake.

FIG. 3 describes an attack scenario in the case of authentication according to a conventional method. The present FIG. 3 serves to illustrate a man-in-the-middle attack according to a conventional challenge-response authentication method. A server 33 authenticates a device 31 using an authentication unit 30. The server 33 for that purpose requests a certificate Z of the device 31 by means of a Get_Device-_Cert message GDC. In the example shown an attacker 32 has managed to tap into the message flow between the server 33 and the device 31, meaning to eavesdrop on the exchange of messages between the server 33 and the device 31. In accordance with the request, the authentication unit 30 conveys a certificate Z to the server 33 in a Cert message Cert. At an ensuing step S1 of the method the server 33 generates a challenge Ch (or challenge message) as a function of which the authentication unit 30 computes a response message Re. The response message Re can be computed as a function of the implementation of a device authentication method AD(Ch). The response message Re can be verified as a function of the implementation of a response authentication method ADR(Re). The server 33 verifies at a step S2 whether the response message Re that was calculated by the authentication unit 30 is valid in terms of the expected response message according to the challenge message Ch.

The server 33 will in the attack scenario described in FIG. 3 therefore have successfully authenticated the device 31, although the attacker 32 will only have forwarded the messages of the server 33 to the device 31. The server 33 erroneously assumes that it is communicating with an original device. The attacker 32 can, though, use a different original device for calculating a valid device authentication response message.

Conventional device authentication methods are often unreliable and cannot be performed without using substantial resources. The lack of reliability associated with conventional methods can arise particularly in connection with creating the challenge message. A multiplicity of instances that greatly increase the need for resources are also necessary in conventional methods. A multiplicity of participating instances can furthermore result in a lack of reliability on the part of the authentication method employed because exchanged messages can be intercepted and/or falsified on their way between the multiplicity of instances.

SUMMARY

According to various embodiments, an improved system or, as the case may be, an improved apparatus for reliably authenticating a device or, as the case may be, for modifying a challenge message as a function of examiner-context information can be provided.

According to an embodiment, a system for reliably authenticating a device, may comprise an examination apparatus which verifies an identity of the device as a function of a response message, wherein the device computes the response message as a function of a modified challenge message and an examiner-linking apparatus computes the modified challenge message as a function of examiner-context information and a challenge message that have been made available.

According to a further embodiment, the examiner-context information can be created as a function of at least one feature of the examination apparatus. According to a further embodiment, the examination apparatus may have an identity feature, an IP address, a computer name, a MAC address, a certificate, a session key, a key, and/or an authentication token. According to a further embodiment, the examination apparatus may have an examiner-context information provisioning unit for making the examiner-context information available and/or a challenge-message provisioning unit for making the challenge message available. According to a further embodiment, a key administration device KDC can make the examiner-context information and/or the challenge message available. According to a further embodiment, the examiner-linking apparatus may have a first challenge modification unit which computes the modified challenge message according to a key derivation function as a function of the examiner-context information and the challenge message. According to a further embodiment, the examination apparatus may verify the response message by means of a second challenge modification unit and a response verification unit, the second challenge modification unit computing the modified challenge message according to the key derivation function and the response verification unit verifying the response message as a function of the computed modified challenge message. According to a further embodiment, a selection unit may select the key derivation function from a set of key derivation functions stored in a data memory and makes the selected key derivation function available to at least one of the challenge modification units. According to a further embodiment, the stored set of key derivation functions may include MD5, SHA-1, SHA-256, SHA-512, HMAC, and CRC32. According to a further embodiment, the device may convey the computed response message to the examiner-linking apparatus and the examiner-linking apparatus conveys the computed response message to the examination apparatus. According to a further embodiment, the device may convey the calculated response message to the examination apparatus.

According to another embodiment, an examiner-linking apparatus for modifying a challenge message as a function of examiner-context information, in particular for use in a system as described above, may comprise:—an examiner-context information interface for receiving the examiner-context information and making it available to an examiner-linking unit; a challenge-message interface for receiving the challenge message and making it available to the examiner-linking unit; and the examiner-linking unit which computes a modified challenge message as a function of the examiner-context information and the challenge message that have been made available.

According to yet another embodiment, a method for reliably authenticating a device, in particular for operating a system as claimed in one of claims 1 to 11, may comprise the steps:—Computing a modified challenge message as a function of examiner-context information and a challenge message that have been made available;—computing a response message as a function of the modified challenge message; and—verifying an identity of the device as a function of the response message.

According to yet another embodiment, a method for modifying a challenge message as a function of examiner-context information, in particular for operating an examiner-linking apparatus as described above, may comprise the steps:— Making the examiner-context information available to an examiner-linking unit;—making the challenge message available to the examiner-linking unit; and—calculating a modified challenge message as a function of the examiner-context information and the challenge message that have been made available.

According to yet another embodiment, a computer program product may be designed for operating a system as described above and/or for operating an examiner-linking apparatus as described above.

According to yet another embodiment, a data memory may store the computer program product as described above.

BRIEF DESCRIPTION OF THE DRAWINGS

The invention is explained in more detail below with the aid of exemplary implementations and with reference to the attached figures, in which:

FIG. 9 is a sequence chart of a method for reliably authenticating a device according to an exemplary embodiment; and FIG. 10 is a sequence chart of a method for reliably authenticating a device having a key distributing unit according to an exemplary embodiment.

Figure 1:
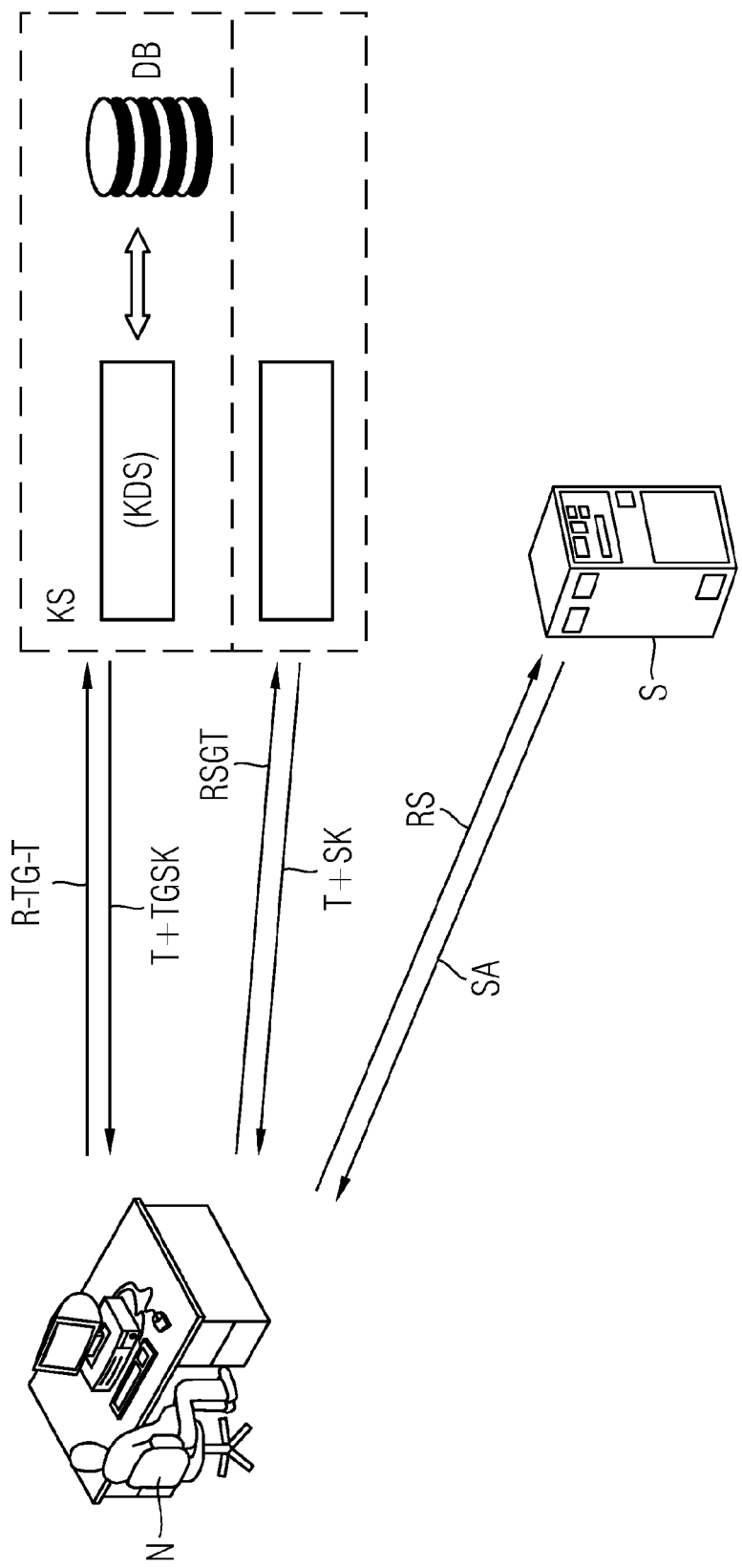
FIG. 1 shows an authentication protocol according to a conventional method.
Figure 2:
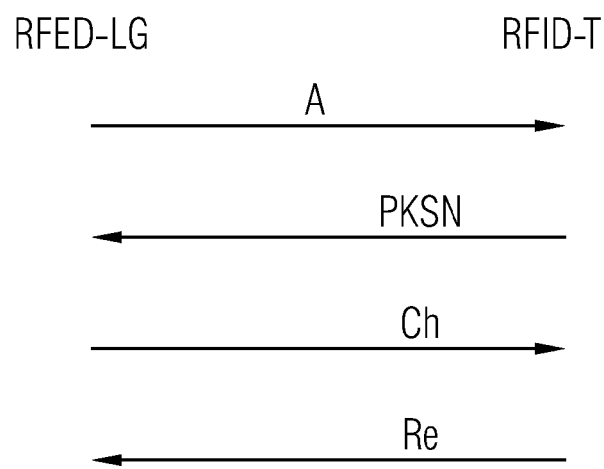
FIG. 2 is a schematic of a message exchange according to a conventional challenge-response method.
Figure 3:
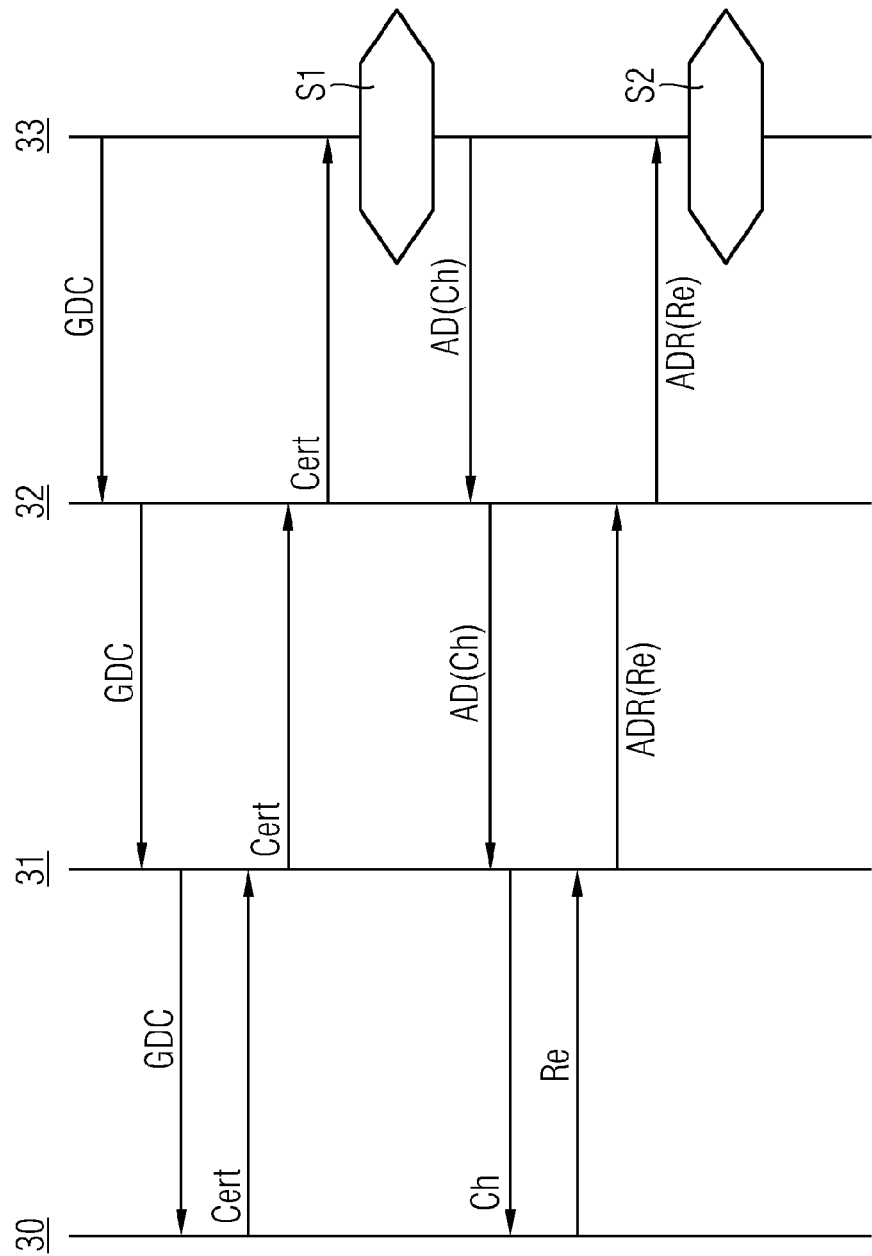
FIG. 3 shows an attack scenario according to a conventional man-in-the-middle method.

Unless indicated otherwise, elements that are the same or functionally identical have been labeled with the same reference signs in the figures.

DETAILED DESCRIPTION

A system for reliably authenticating a device is accordingly provided, having:

An examination apparatus which verifies an identity of the device as a function of a response message, wherein the device computes the response message as a function of a modified challenge message and an examiner-linking apparatus computes the modified challenge message as a function of context information and a message that have been made available.

Device authentication can relate to, for example, an authenticity check performed on a sensor or battery. A device can be embodied also as a virtual apparatus. The system according to various embodiments is thus equally suitable for reliably authenticating a client and/or server. The examination apparatus can be present in the form of, for example, a server that checks an identity of a client device. The examiner-linking apparatus can be present in the form of, for example, a virtual computing unit or a virtual and/or physical server. Messages can be exchanged between the examination apparatus, examiner-linking apparatus and device over a data link. The data link can therein have further components that are typical in a network.

The examination apparatus is suitable for creating a challenge message and conveying it to the examiner-linking apparatus. The challenge message can be created for example as a function of a random number or, as the case may be, pseudo random number generated by the examination apparatus. The examination apparatus then conveys examiner-context information to the examiner-linking apparatus. The examiner-linking apparatus computes a modified challenge message as a function of the conveyed examiner-context information and the challenge message. The modified challenge message can be calculated using a context-binding function. The context-binding function can be in the form of a key derivation function which as input parameters uses the examiner-context information and challenge message that have been made available.

In an embodiment variant the computed modified challenge message is conveyed to the device which creates a response message as a function of the modified challenge message. The response message can be created using a cryptographic key. After being computed, the response message is conveyed to the examination apparatus by means of the examiner-linking apparatus. The examination apparatus is suitable for calculating the modified key as a function of the examiner-context information and challenge message that have been made available. The creation of the modified challenge message by the examination apparatus can be performed analogously to the creation of the modified challenge message by the examiner-linking apparatus. Thus, the same context-binding function and/or the same input parameters can therein be used for both computations. As a function of the modified challenge message calculated by the examination apparatus, the examination apparatus is suitable for verifying the response message made available by the device. This is done by means of, for example, a response verification function which as input parameters uses the response message that has been made available and/or the modified challenge message created by the examination apparatus.

If, in accordance with the challenge-response method already described, the response message made available by the device constitutes a response to the challenge message made available by the examination apparatus, the device will be recognized as an original device. That means the device is present in the form of the communication partner actually envisaged by the examination apparatus and the device's identity will have been authenticated.

In an embodiment variant of the system the examiner-context information is created as a function of at least one feature of the examination apparatus.

This has the advantage that the modified challenge message will be calculated as a function of a challenge message that has been made available and at least one additional parameter, namely the examiner-context information. It has the further advantage that the examination apparatus verifies a response message that was calculated in relation to a challenge message computed precisely by said examination apparatus. This contributes substantially to reliable authentication of the device.

In another embodiment variant of the system the examination apparatus has an identity feature, an IP address, a computer name, a MAC address, a certificate, a session key, a key, and/or an authentication token.

This has the advantage that the examiner-context information can be created as a function of precisely these features of the examination apparatus. Because these features relate to the examination apparatus, the examiner-context information cannot be imitated by a third instance, in particular by an attacker.

In another embodiment variant of the system the examination apparatus has an examiner-context information provisioning unit for making the examiner-context information available and/or a challenge-message provisioning unit for making the challenge message available.

This offers the advantage that the examination apparatus is able to autonomously compute both the examiner-context information and the challenge message. Further security mechanisms can hence be integrated in the proposed system.

In another embodiment variant of the system a key administration device KDC makes the examiner-context information and/or challenge message available.

This has the advantage that the examiner-context information and/or challenge message will be made available by a third, for example especially trusted, entity. Already implemented security mechanisms can consequently also be used in the proposed system.

In another embodiment variant of the system the examiner-linking apparatus has a first challenge modification unit that computes the modified challenge message as a function of the examiner-context information and challenge message according to a key derivation function.

This offers the advantage that already implemented key derivation functions can be used for calculating the modified challenge message. It has the further advantage that the challenge message that has been made available can be encrypted by the examiner-linking apparatus as a function of the examiner-context information.

In another embodiment variant of the system the examination apparatus verifies the response message by means of a second challenge modification unit and a response verification unit, the second challenge modification unit computing the modified challenge message according to the key derivation function and the response verification unit verifying the response message as a function of the computed modified challenge message.

The response message can therein be checked or, as the case may be, verified using the same cryptographic key (a method referred to also as secret key cryptography) or a second key assigned to the first cryptographic key (a method referred to also as public key cryptography).

This has the advantage that the response message will be verified as a function of a modified challenge message computed by the examination apparatus.

In another embodiment variant of the system a selection unit selects the key derivation function from a set of key derivation functions stored in a data memory and makes the selected key derivation function available to at least one of the challenge modification units.

This has the particular advantage that a key derivation function can be selected from a multiplicity of key derivation functions. The first and second challenge modification unit can therein advantageously both employ the same key derivation function.

In another embodiment variant of the system the stored set of key derivation functions includes methods that are based on MD5, SHA-1, SHA-256, SHA-512, HMAC, and/or CRC32.

This has the advantage that the key derivation function can be selected from a multiplicity of known key derivation functions.

In another embodiment variant of the system the device conveys the computed response message to the examiner-linking apparatus and the examiner-linking apparatus conveys the computed response message to the examination apparatus.

This offers the advantage that the challenge and response message will be conveyed to the examination apparatus by the same instance in each case, namely the examiner-linking apparatus.

In another embodiment variant of the system the device conveys the computed response message to the examination apparatus.

The consequent advantage is that the device will convey the computed response message directly to the examination apparatus.

According to other embodiments, an examiner-linking apparatus for modifying a challenge message as a function of examiner-context information, may comprise:

An examiner-context information interface for receiving the examiner-context information and making it available to an examiner-linking unit;

a challenge-message interface for receiving a challenge message and making it available to the examiner-linking unit; and the examiner-linking unit which computes a modified challenge message as a function of the examiner context information and challenge message that have been made available.

The proposed examiner-linking apparatus can be employed in a system according to the aforementioned exemplary embodiments.

Other embodiments relate further to a method for reliably authenticating a device, in particular for operating a system according to one of the aforementioned exemplary embodiments, having the steps:

Computing a modified challenge message as a function of examiner-context information and a challenge message that have been made available;

computing a response message as a function of a modified challenge message; and verifying an identity of a device as a function of the computed response message.

Other embodiments relate further to a method for modifying a challenge message as a function of examiner-context information, in particular for operating an examiner-linking apparatus according to the above-described exemplary embodiments, having the steps:

Making the examiner-context information available to an examiner-linking unit;

making the challenge message available for the examiner-linking unit; and computing a modified challenge message as a function of the examiner-context information and challenge message that have been made available.

Other embodiments relate further to a computer program product for operating a system according to one of the aforementioned embodiment variants and/or for operating one of the aforementioned examiner-linking apparatuses.

Yet other embodiments, relate further to a data memory which stores the aforementioned computer program product.

The various embodiments hence provide a system and an examiner-linking apparatus together with corresponding methods which by linking a challenge message to an examination apparatus allow a device to be reliably authenticated. The challenge message is linked to the examination apparatus by the examiner-linking apparatus for modifying a challenge message as a function of examiner-context information according to various embodiments.

Figure 4:
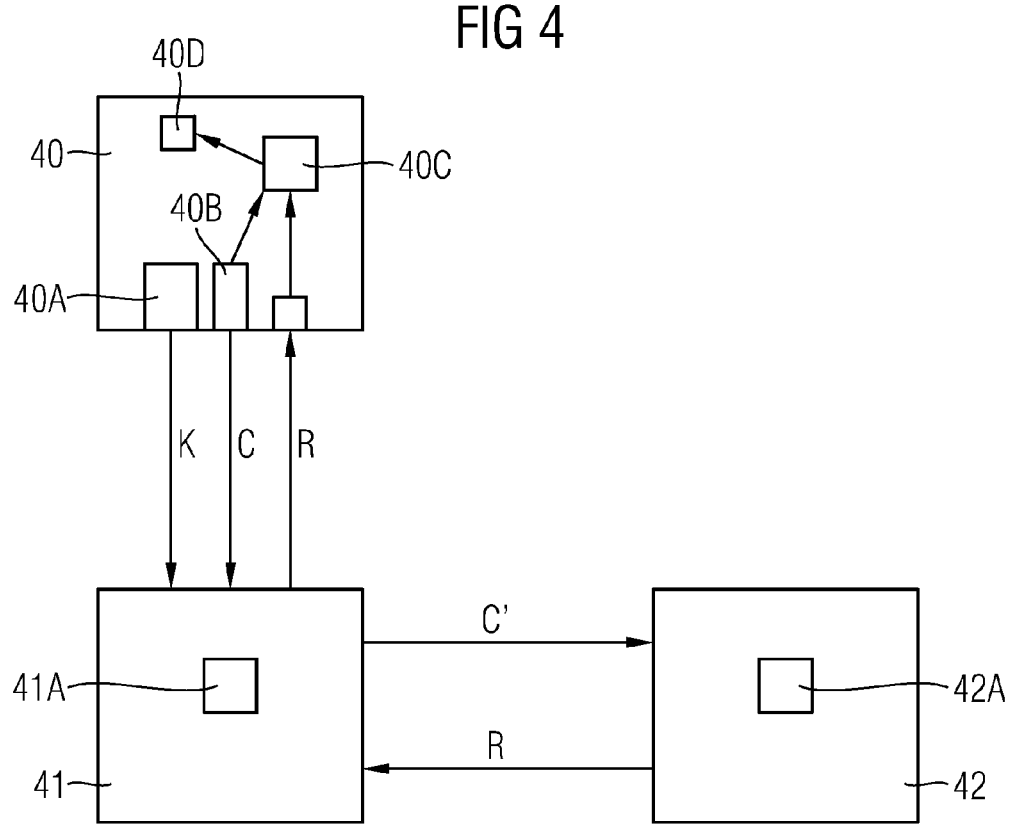
FIG. 4 shows a system for reliably authenticating a device according to an exemplary embodiment.

FIG. 4 describes a system for reliably authenticating a device 42. The system has an examination apparatus 40 which verifies an identity of the device 42 as a function of a received response message R. The device 42 computes the response message R as a function of a modified challenge message C'. An examiner-linking apparatus 41 is further provided which computes a modified challenge message C' as a function of examiner-context information K made available by the examination apparatus 40 and of a challenge message C made available by the examination apparatus 40.

In one embodiment variant the examination apparatus 40 has an examiner-context information provisioning unit 40A which generates the examiner-context information K. The examiner-context information provisioning unit 40A is suitable for determining features of the examination apparatus 40 and/or for reading out said features from a data memory. Said features include, for example, an identity feature ID, an IP address, a computer name, a MAC address, a certificate, a session key, a key, or an authentication token of the examination apparatus 40.

Particularly features of a server are suitable for generating the examiner-context information K by the examiner-context information provisioning unit 40A, its being possible for the examination apparatus 40, the examiner-linking apparatus 41, the device 42 or an authentication service to act as a server. The examiner-context information can be calculated as a function of at least one of the following features:

- A server identity, for example an IP address, a DNS computer name, and a MAC address, provided the examiner unit and authentication unit are located in the same subnetwork, which is to say use their own MAC addresses for addressing and not those of a router;
- a server certificate or, as the case may be, a field or plurality of fields of the server certificate; specifically the server public key or the certificate's fingerprint computed by means of a hash function;
- a session key or, as the case may be, a value of the security session that has been derived from said key and agreed by the network security protocol;
- a preshared key or, as the case may be, the derivation of a preshared key between an examiner unit and an authentication unit;
- an authentication token by means of which the server previously authenticated itself;
- if mutual authentication takes place, it is possible to take account also of the client identity or client certificate or parts thereof; and/or
- a random number generated by means of the examiner-context information provisioning unit 40A.

In another embodiment variant the examination apparatus 40 has a second challenge modification unit 40C. The challenge modification unit 40C can therein correspond to the challenge modification unit 41A of the examiner-linking apparatus 41. The two challenge modification units 40C and 41A are therein preferably both present as two separate entities. The two challenge modification units 40C and 41A can communicate with a selection unit which makes a key derivation function available for computing the modified challenge message.

The device 42 is suitable for deriving a response message R from the modified challenge message C' by means of a response-message provisioning unit 42A. Conventional key derivation methods can be employed, for example, for deriving the response message R from the modified challenge message C'.

The response message R generated by the device 42 is sent to a verification unit 40D that is provided in, for example, the examination apparatus 40. The verification unit 40D is suitable—using the received response message R and the modified challenge message C'—for determining whether the response message R received from the device 42 tallies with the response to the modified challenge message C' that is to be expected. If it does, the device 42 will be positively authenticated, meaning the device 42 will have returned the expected response message R.

Figure 5:
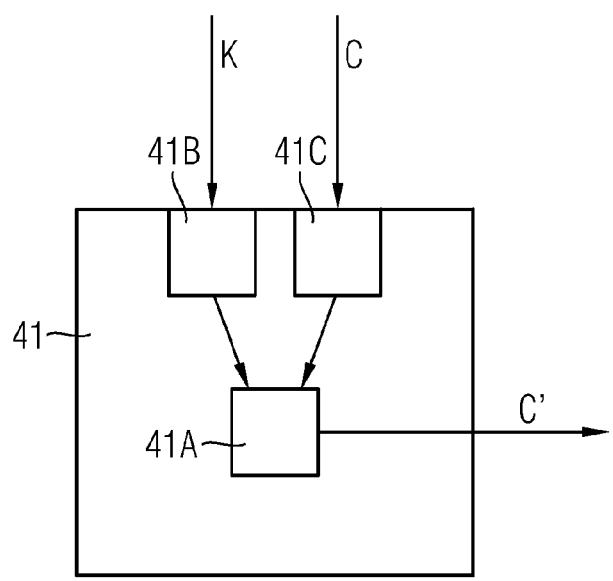
FIG. 5 shows an examiner-linking apparatus for modifying a challenge message according to an exemplary embodiment.

FIG. 5 shows an examiner-linking apparatus 41 for modifying a challenge message C as a function of examiner-context information K, having:

An examiner-context information interface 41B for receiving the examiner-context information K and making it available to an examiner-linking unit 41A. The examiner-linking apparatus 41 further contains a challenge-message interface 41C for receiving the challenge message and making it available to the examiner-linking unit 41A. The examiner-linking unit 41A computes a modified challenge message C' as a function of the examiner-context information K and the challenge message C that have been made available.

The examiner-linking apparatus 41 described in the present FIG. 5 is used in, for example, a system as shown in FIG. 4.

Figure 6:
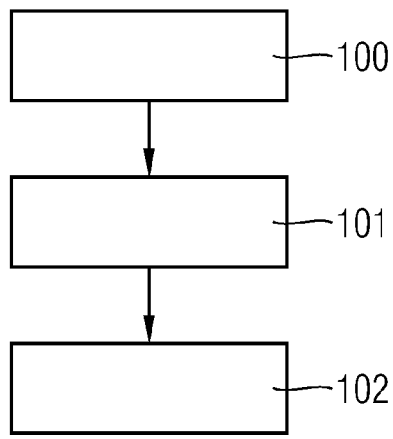
FIG. 6 shows a method for reliably authenticating a device according to an exemplary embodiment.

FIG. 6 is a flowchart of a method for reliably authenticating a device 42, in particular for operating a system as shown in FIG. 4. The method therein includes the following steps:

At a step 100 a modified challenge message C' is computed as a function of examiner-context information K and a challenge message C that have been made available.

A response message R is then computed as a function of the modified challenge message C' at a step 101.

An identity of the device 42 is thereafter verified at a step 102 as a function of the response message R.

The described steps of the method can be performed iteratively and/or in a different sequence.

Figure 7:
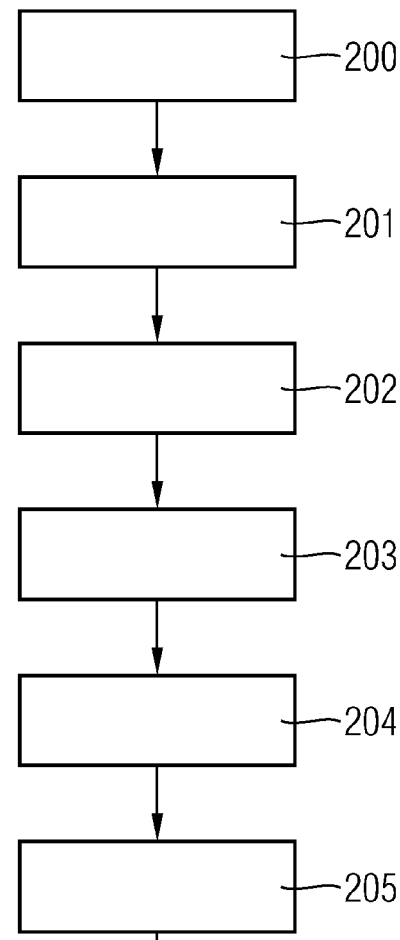
FIG. 7 is a detailed description of a method for reliably authenticating a device according to an exemplary embodiment.

FIG. 7 is a detailed flowchart of a method for reliably authenticating a device 42.

The challenge message C is made available to the examiner-linking apparatus 41 by the examination apparatus 40 at a preparatory step 200 of the method. The process of making the challenge message C available can have further, subsidiary steps such as, for instance, generating the challenge message C. The challenge message C can be generated as, for example, a function of a random number or a pseudo random number. The challenge message can also be composed of a plurality of individual items of information. The challenge message C can have a timestamp, for instance.

The examiner-context information K is made available to the examiner-linking apparatus 41 by the examination apparatus 40 at an ensuing step 201 of the method. The process of making the examiner-context information K available can include further, subsidiary steps such as, for instance, generating the examiner-context information K. The process of generating the examiner-context information K can also include reading out features of the examination apparatus 40.

As an alternative to the process described at step 200 of the method of making the challenge message C available and making the examiner-context information K available in another message at step 201 of the method, both messages can be made available to the examiner-linking apparatus 41 jointly at one step of the method. For example the challenge message C and the examiner-context information K can be transmitted in a joint message or, as the case may be, joint file.

The challenge message C and the examiner-context information K can alternatively be made available by another instance, for example a key distribution apparatus or, as the case may be, a key distribution center KDC.

A context-binding function CB(K; C)=C' is computed at an ensuing step 202 of the method. The context-binding function CB serves to bind the examiner-context information K to the challenge message C for generating the modified challenge message C'. Step 202 of the method can have further, subsidiary steps such as, for instance, selecting the context-binding function CB( ) or, as the case may be, making the context-binding function CB( ) available by reading it out from a data memory. The generated modified challenge message C' can alternatively be referred to also as a context-specific challenge C'.

The modified challenge message C' is conveyed to the device 42 at an ensuing step 203 of the method.

The response message R is computed at an ensuing step 204 of the method as a function of the modified challenge message C' that has been made available. The response message R is computed by means of a key derivation function f(C')=R. The process of making the response message R available can include further, subsidiary steps such as, for instance, selecting the key derivation function f( ). The response message can furthermore be computed instead using a cryptographic key.

The response message R is conveyed from the device 42 to the examiner-linking apparatus 41 at an ensuing step 205 of the method. The examiner-linking apparatus 41 conveys the response message R to the examination apparatus 40 at an ensuing step 206 of the method. What happens, therefore, is that the response message R is forwarded from the device 42 to the examination apparatus 40. At a step that is alternative to steps 205 and 206 of the method the response message R is conveyed directly from the device 42 to the examination apparatus 40.

The context-binding information CB(K; C)=C' is computed at an ensuing step 207 of the method. It may for that purpose be necessary for the examiner-linking apparatus 41 to convey the examiner-context information K to the examination apparatus 40. The examiner-context information K that has been made available serves as an input parameter of the context-binding function CB(K; C). Thus, the context-binding function for the examiner-context information K and the challenge message C is computed at step 207 analogously to step 202 of the method.

The response message R made available at step 206 of the method and the modified challenge message C' calculated at step 207 of the method are verified at an ensuing step 208 of the method. A check is consequently carried out at step 208 of the method to establish whether the response message R made available at step 206 of the method tallies with the expected response to the challenge message C made available at step 200 of the method. The verification function employed at step 208 of the method can be referred to as, for example, a response verification function RV(R; C'). As return value said response verification function RV( ) supplies a Boolean value indicating whether the response message R made available at step 206 of the method is the expected response to the modified challenge message C'. The identity of the device 42 is thus checked at step 208 of the method using the parameters already employed.

The described steps of the method can be performed iteratively and/or in a different sequence.

Figure 8:
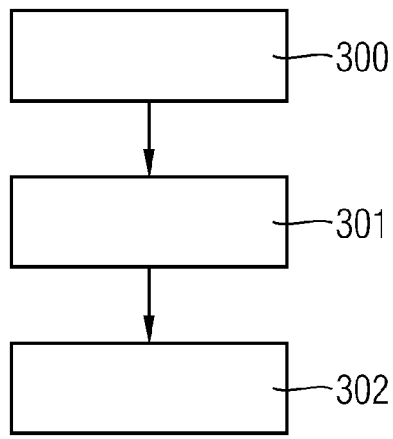
FIG. 8 shows a method for modifying a challenge message as a function of examiner-context information according to an exemplary embodiment.

FIG. 8 describes a method for modifying a challenge message C as a function of examiner-context information K in particular for operating an examiner-linking apparatus 41 as shown in FIG. 5, having the following steps:

Making the examiner-context information K available to an examiner-linking unit 41 at step 300 of the method. The challenge message C is thereupon made available 301 to the examiner-linking unit 41. A modified challenge message C' is furthermore computed 302 as a function of the examiner-context information K and the challenge message C that have been made available.

The above-described steps of the method can be performed iteratively and/or in a different sequence.

FIG. 9 is a detailed sequence chart of an embodiment variant of the method for reliably authenticating a device 42. A server 93 therein communicates with a device 91 by means of the M2M module 92. The M2M module 92 can be present in the form of, for example, a typical network component.

The device 91 sets up an SSL connection to the server 93 via the M2M module 92. The individual messages involved in setting up an SSL connection have not been shown. In the present exemplary embodiment the server 93 and the device 91 authenticate themselves in an authentication process Auth. The server_ID is stored at a step S10 of the method. The server 93 then sends the device 91 a get_device_cert message GDC. Said get_device_cert message GDC is conveyed by the device 91 to a device authentication unit 90. Said device authentication unit 90 conveys a Cert message to the device 91 which forwards the Cert message to the server 93. A challenge message is created by the server 93 at a step S11 of the method. The server 93 initiates a method call to invoke an authentication method AuthD(c).

The challenge message C-Bound is derived at an ensuing step S12 of the method. This can be done by means of, for example, the following instruction:

Derive Challenge C-Bound:=*KDF*(*C*,Server_ID).

The calculated C-Bound message is conveyed by the device 91 to the device authentication unit 90. Said device authentication unit 90 thereupon conveys a response message Res to the device 91. The device 91 thereupon initiates a method call AuthD(res).

The challenge message C-Bound is derived again at a step S13 of the method.

In the present exemplary embodiment the challenge message C-Bound is thus created as a function of a server_ID of the server 93. A modified challenge message is hence created at step S12 of the method in accordance with a challenge message made available by the server 93 and with a server_ID of the server 93.

The described steps of the method can be performed iteratively and/or in a different sequence.

FIG. 10 is a detailed sequence chart of a method for reliably authenticating a device 42 with an authentication by a trusted third-party instance.

In the present exemplary embodiment a further instance, namely a key distribution center apparatus 94, is added to the method as described in FIG. 9. An SSL-server-side authentication thus takes place between the device 91 and the server 93 by means of a server certificate as well as a device authentication by means of a token belonging to the KDC server 94.

In the present exemplary embodiment an authentication as well as a challenging of an authorization and a challenging of a challenge message take place according to the double-sided arrow 95 shown in present FIG. 10.

A challenge message C_Bound is created at a step S20 of the method by a key distribution service 94, referred to also as a key distribution center 94.

A server_ID is stored by the device 91 at an ensuing step S21 of the method. A token message having authorization information and the challenge message C_Bound computed at step S20 of the method are thereupon conveyed in accordance with the message exchange 96 shown in the present figure. By means of the challenge message C_Bound computed at step S20 of the method, the device 91 thereupon requests a service from the server by means of an exchange of messages 97. The server 93 thereupon conveys an authentication message AuthDev to the device 91. Both challenge message C_Bound and the server_ID will consequently be available to the device 91.

At an ensuing step S22 of the method the examiner-context information K or, as the case may be, the server_ID is linked to the challenge message C_Bound. In the present exemplary embodiment this is done by the device 91. Said linking can be implemented possibly by, for example, the following source text:

Derive Challenge $C$-Bound:=$KDF(C\_Bound,Server\_ID)$.

The C-Bound message calculated at step S22 of the method is thereupon conveyed to a device authentication unit 90. Said device authentication unit 90 thereupon computes a response message Res and conveys it to the device 91. The device 91 thereupon initiates the execution of an authentication method using the input parameter Res.

The challenge message C_Bound is consequently derived for a second time at a step S23 of the method by the server 93. Said second derivation can be implemented by means of, for example, the following instruction:

Device Challenge $C$-Bound:=$KDF(C\_Bound,Server\_ID)$.

The response message Re that has been conveyed is verified at a further step S24 of the method by the server 93.

In the present exemplary embodiment the device 91 has consequently been authenticated by means of examiner-context information K, referred to in the present exemplary embodiment also as the server_ID. The challenge message C_Bound was for that purpose linked by means of the server_ID to a modified challenge message C', referred to in the present exemplary embodiment also as C_Bound.

Compared with the exemplary embodiment described in FIG. 9, in the exemplary embodiment described in FIG. 10 an authentication was consequently carried out by means of a trusted third-party instance, namely the key distribution center apparatus 94.

The above-described steps of the method can be performed iteratively and/or in a different sequence.

What is claimed is:

1. A system for reliable authentication of a device by an examination apparatus, comprising:
   an examination apparatus configured to create a challenge message;
   an examiner-linking apparatus communicatively coupled to the examination apparatus and configured to compute a modified challenge message as a function of both (a) examiner-context information received from an examination apparatus communicatively coupled to a device to be authenticated and (b) the challenge message received from the examination apparatus, wherein the modified challenge message is a modification of the challenge message;
   the device to be authenticated communicatively coupled to the examiner-linking apparatus and configured to receive the modified challenge message from the examiner-linking apparatus and compute a response message as a function of the modified challenge message; and
   wherein the examination apparatus is configured to receive the response message, and configured to verify an identity of the device as a function of the response message received from the device.

2. The system according to claim 1, wherein a key administration device KDC is configured to make at least one of the examiner-context information and the challenge message available.

3. The system according to claim 1, wherein the device is configured to the computed response message to the examiner-linking apparatus and the examiner-linking apparatus is configured to the computed response message to the examination apparatus.

4. The system according to claim 1, wherein the device is configured to the calculated response message to the examination apparatus.

5. An examiner-linking apparatus for modifying a challenge message as a function of examiner-context information, in particular for use in a system according to claim 1, comprising:
   an examiner-context information interface for receiving the examiner-context information from an examiner-context information provisioning unit of an examination apparatus and making it available to an examiner-linking unit;
   a challenge-message interface for receiving the challenge message from a challenge-message provisioning unit of the examination apparatus and making it available to the examiner-linking unit; and
   the examiner-linking unit configured to compute a modified challenge message as a function of the examiner-context information using a context-binding function and the challenge message that have been made available for transmitting the modified challenge message to a device to be authenticated by the examination apparatus.

6. The system according to claim 1, wherein the examiner-context information is created as a function of at least one feature of the examination apparatus.

7. The system according to claim 6, wherein the examination apparatus has an identity feature, an IP address, a computer name, a MAC address, a certificate, a session key, a key, and/or an authentication token.

8. The system according to claim 1, wherein the examination apparatus comprises at least one of an examiner-context information provisioning unit for making the examiner-context information available and a challenge-message provisioning unit for making the challenge message available.

9. The system according to claim 8, wherein the examiner-linking apparatus includes a first challenge modification unit configured to compute the modified challenge message according to a key derivation function as a function of the examiner-context information and the challenge message.

10. The system according to claim 9, wherein the examination apparatus includes a second challenge modification unit and a response verification unit, the second challenge modification unit configured to compute the modified challenge message according to the key derivation function and the response verification unit configured to verify the response message as a function of the computed modified challenge message.

11. The system according to claim 9, wherein a selection unit is configured to select the key derivation function from a set of key derivation functions stored in a data memory and make the selected key derivation function available to at least one of the challenge modification units.

12. The system as according to claim 11, wherein the stored set of key derivation functions includes MD5, SHA-1, SHA-256, SHA-512, HMAC, and CRC32.

13. A method for reliably authenticating a device, comprising:
receiving a challenge message from an examination apparatus at an examiner-linking apparatus;
computing, at the examiner-linking apparatus, a modified challenge message as a function of examiner-context information and a challenge message, the examiner-context information and the challenge message received from the examination apparatus via one or more networks, wherein the modified challenge message is a modification of the challenge message;
providing the modified challenge message over the one or more networks to the device;
computing, at the device, a response message as a function of the modified challenge message;
receiving the response message at the examination apparatus via the one or more networks; and
verifying an identity of the device at the examination apparatus as a function of the response message received from the device.

14. A method for providing a challenge message to a device to be authenticated as a function of examiner-context information, comprising:
making the examiner-context information available from an examination apparatus to an examiner-linking unit via a network;
making the challenge message available to the examiner-linking unit from the examination apparatus via the network;
calculating a modified challenge message at the examiner-linking unit as a function of the examiner-context information and the challenge message wherein the modified challenge message is modified via a context-binding function;
making the modified challenge message available via the network to the device to be authenticated;
receiving a response message from the device to be authenticated; and
verifying the identity of the device via a Response-Verification function with the received response and/or the modified challenge message as input parameters.

15. A computer program product comprising a computer readable medium storing instructions which when executed on a computer perform:
computing a modified challenge message as a function of examiner-context information and a challenge message, the examiner-context information and the challenge message received at the computer from an examination apparatus via a network, wherein the modified challenge message is modified via a context-binding function;
computing a response message of a device to be authenticated as a function of the modified challenge message;
verifying an identity of the device as a function of the response message transmitted by the device, wherein the identity is verified via a Response-Verification function with the transmitted response and/or the modified challenge message as input parameters.

16. The computer program product according to claim 15, wherein when executed on a computer, the instructions further perform conveying the computed response message to an examination apparatus.

17. The computer program product according to claim 15, wherein the examiner-context information is a function of at least one feature of the examination apparatus.

18. The computer program product according to claim 17, wherein the examination apparatus has an identity feature, an IP address, a computer name, a MAC address, a certificate, a session key, a key, and/or an authentication token.

* * * * *